(12) United States Patent
Zhang et al.

(10) Patent No.: US 10,684,101 B2
(45) Date of Patent: Jun. 16, 2020

(54) FOLDING BULLETPROOF SHIELD

(71) Applicant: Chuanzhong Zhang, Shanghai (CN)

(72) Inventors: Chuanzhong Zhang, Shanghai (CN); Honglinag Liu, Shanghai (CN)

(73) Assignee: Chuanzhong Zhang, Shanghai (CN)

( * ) Notice: Subject to any disclaimer, the term of this patent is extended or adjusted under 35 U.S.C. 154(b) by 0 days.

(21) Appl. No.: 16/082,809

(22) PCT Filed: Mar. 9, 2017

(86) PCT No.: PCT/CN2017/076077
§ 371 (c)(1),
(2) Date: Sep. 6, 2018

(87) PCT Pub. No.: WO2017/152850
PCT Pub. Date: Sep. 14, 2017

(65) Prior Publication Data
US 2019/0093990 A1    Mar. 28, 2019

(30) Foreign Application Priority Data

Mar. 11, 2016  (CN) .......................... 2016 1 0139606
Jul. 25, 2016  (CN) .......................... 2016 1 0621494

(51) Int. Cl.
*F41H 5/08* (2006.01)
*F41H 5/007* (2006.01)
(Continued)

(52) U.S. Cl.
CPC ............... *F41H 5/08* (2013.01); *F41H 5/007* (2013.01); *B32B 7/022* (2019.01); *B32B 15/14* (2013.01);
(Continued)

(58) Field of Classification Search
CPC ..... F41H 5/00; F41H 5/02; F41H 5/04; F41H 5/0471; F41H 5/08; F41H 5/0442;
(Continued)

(56) References Cited

U.S. PATENT DOCUMENTS 2,306,708 A * 12/1942 Mendel .................. F41C 27/04
  42/106
3,745,938 A *  7/1973 Hathaway .............. F41H 5/08
  109/49.5
(Continued)

FOREIGN PATENT DOCUMENTS

CN       202018238      10/2011
CN       103629977       3/2014
(Continued)

OTHER PUBLICATIONS

International Search Report issued in International Application No. PCT/CN2017/076077 dated Jun. 8, 2017 (8 pages).
(Continued)

*Primary Examiner* — John Cooper
(74) *Attorney, Agent, or Firm* — Hamre, Schumann, Mueller & Larson, P.C.

(57) ABSTRACT

The existing personal bulletproof equipment has the disadvantages such as a simple structure, insufficient folding and lack of an automatic opening function, and is thus not suitable for one-handed operations in a narrow and small space inside a vehicle. A foldable bulletproof shield disclosed in the present invention comprises a shield plate, a handle, an unfolding power device and an unfolding control device. The folding of the shield plate is realized by means of its own deformation. The unfolding power device is an elastic force device or an elastic structure provided in the foldable shield plate. The unfolding control device is composed of a button, a buckle, a strap, etc. and is integrated with the handle, such that a user enables the bulletproof shield to rapidly switch from a folded state to an unfolded state with one-handed operations.

7 Claims, 7 Drawing Sheets

(51) Int. Cl.
*B32B 7/022* (2019.01)
*B32B 15/14* (2006.01)

(52) U.S. Cl.
CPC ....... *B32B 2307/51* (2013.01); *B32B 2571/02* (2013.01)

(58) Field of Classification Search
CPC . F41H 5/0428; F41H 5/06; F41H 5/18; B32B 7/022; B32B 15/14; B32B 2307/51
USPC .......... 89/36.05, 36.01, 36.07, 36.02; 2/2.5; 428/911
See application file for complete search history.

(56) References Cited

U.S. PATENT DOCUMENTS

| | | | |
|---|---|---|---|
| 6,647,857 B1 * | 11/2003 | Newkirk | .................. F41H 5/08 296/97.3 |
| 6,691,601 B2 * | 2/2004 | Cohen | ...................... F41H 5/06 109/49.5 |
| 6,807,890 B1 | 10/2004 | Fuqua | |
| 6,886,446 B1 | 5/2005 | Baker | |
| 8,850,948 B1 | 10/2014 | Coats | |
| 2002/0092416 A1 * | 7/2002 | Cohen | ...................... F41H 5/06 89/36.05 |
| 2015/0047940 A1 | 2/2015 | Casas | |
| 2015/0192393 A1 * | 7/2015 | Yakoub | .................... F41H 5/08 89/36.02 |

FOREIGN PATENT DOCUMENTS

| | | | |
|---|---|---|---|
| CN | 203534349 | 4/2014 | |
| CN | 104776756 | 7/2015 | |
| CN | 205066579 | 3/2016 | |
| WO | 2009131727 | 10/2009 | |
| WO | WO-2009131727 A2 * | 10/2009 | ............... F41H 5/08 |
| WO | WO-2016167714 A1 * | 10/2016 | ............... F41H 5/08 |

OTHER PUBLICATIONS

Written Opinion issued in International Application No. PCT/CN2017/076077 dated Jun. 8, 2017 (3 pages).

* cited by examiner

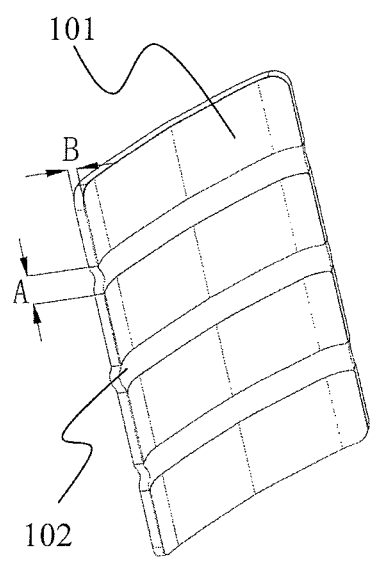
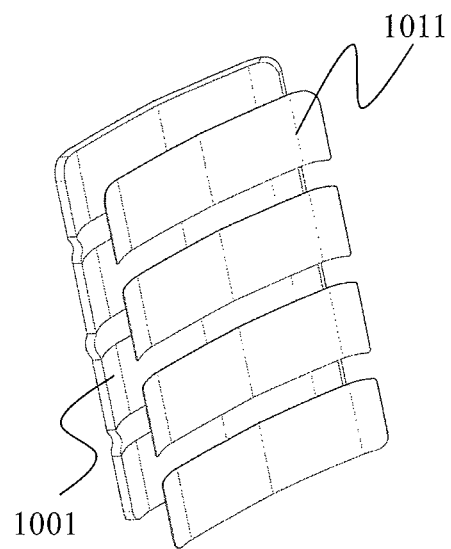
FIG. 11     FIG. 12
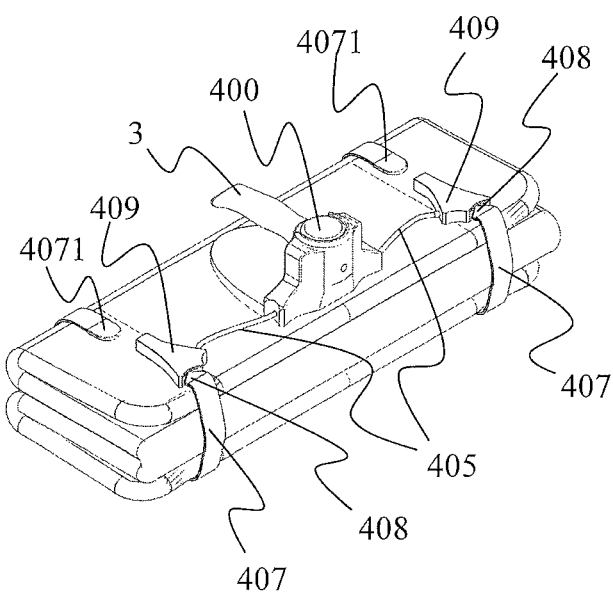
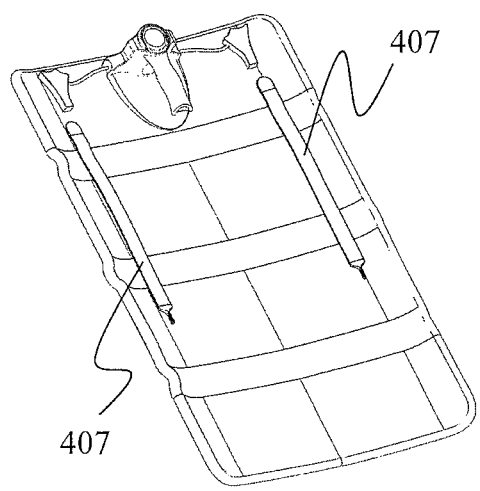
FIG. 13     FIG. 14

FOLDING BULLETPROOF SHIELD

TECHNICAL FIELD

The present invention relates to a bulletproof device for personal use.

BACKGROUND ART

With the technological advancement and cost reduction of bulletproof materials, body armour is becoming more and more widely accepted as general security equipment for civilian use. However, it is still unacceptable for ordinary people who are non-security personnel to wear the body armour everyday as ordinary clothing. As a motor vehicle driver who is likely to be attacked by firearms, a foldable and easily unfolded bulletproof shield is a good choice.

In the existing personal bulletproof equipment, the existing foldable bulletproof devices for police or military use, such as the personal foldable bulletproof devices disclosed in the patent documents CN 103629977 A, CN 104776756 A, US 20150047940 A1, U.S. Pat. Nos. 6,691,601, 6,807,890 and 6,886,446, have the disadvantages such as a simple structure, insufficient folding and lack of an automatic opening function, and are thus not convenient for the driving personnel to operate with one hand in a narrow and small space.

SUMMARY OF THE INVENTION

The present invention discloses a foldable bulletproof shield, which comprises a soft shield plate, a handle, an unfolding power device and an unfolding control device. The shield plate is a plate-like body which prevents passage of a ballistic object, and the term "soft" means that the folding of the shield plate is achieved by its own deformation rather than by the rotation with the aid of a hinge structure. The fold-release power device is tightly connected to the shield plate, enables the bullet-proof shield to rapidly switch from a folded state to an unfolded state, and maintains same in a desired shape. The handle is connected to the shield plate at an appropriate position for easy grip. The unfolding control device is integrated with the handle, and is capable of maintaining the shield in the folded state and enabling the bulletproof shield to rapidly switch from the folded state to the unfolded state under the operation of a user. The folding may be bending, curling or a combination thereof. The bending means a plate-like structure being alternately folded into an overlapping structure along one or more straight lines that are not in direct intersect with each other, such as the folding manner that we usually use to fold an aluminium foil automobile sunshade or the fan portion of a paper folding fan, the straight line being referred to as a folding line. The curling means a plate-like structure being rolled into a cylindrical-like shape along a straight line as an axis. The combination of bending and curling comprises straight line+curling, which is to first fold into two or more layers and then roll into a cylindrical-like shape; and bending+bending is to first bend into a structure having two or more layers and then bend in another direction, generally in the vertical direction. The cylindrical-like shape here refers to a geometric cylinder or a circular tube that is not necessarily very regular.

For the convenience of description, a unified regulation is made here for the directions involved in the text: according to the relative direction of the bulletproof shield when it is placed in front of the human body and when the person stands upright or sits, the vertical direction is equivalent to the up and down direction, and the horizontal direction is equivalent to the left and right direction, the side facing the human body is the rear side, and the side facing away from the human body is the front side.

As a specific preferred solution, the shield plate after being unfolded has an arc-like-shaped cross section in the horizontal direction, like a common hard bulletproof shield, which means that the shield tends to surround the human body when in use, and the human body is protected with the same shield area, greater azimuth angle and smaller occupied surrounding space, and it is also possible for the soft shield plate to better resist against external forces including gravity, so that the soft shield plate is easier to maintain the unfolded state.

In an optional solution of the unfolding power device, a metal spring or a nickel-titanium memory alloy superelastic wire or a superelastic sheet can be selected, wherein the metal spring is low in cost, and the nickel-titanium memory alloy is lighter.

The unfolding control device may use a binding component such as a strap, and a connection locking component such as a buckle, an unfolding trigger button being provided on the buckle, and a safety component may be also added. The specific technical solution of the connection locking component and the unfolding trigger component of the buckle binding device can be referred to the mechanical structure of a simpler vehicle door latch.

The present invention further discloses another technical solution of a foldable bulletproof shield. On the basis of the former solution, the shield plate is modified to be formed by connecting a number of elastic shield plate blocks having a cross section in the shape of an arc-like curve via a soft hinge-like structure also having the function of preventing passage of the ballistic object, wherein the arc-like curve comprises an arc, an elliptic arc, and a curved line which is allowed to include partial straight lines and is generally approximate to the arc or the elliptic arc; and the soft hinge-like structure means that the axis of the hinge is allowed to be a curved narrow band with a certain width, and the axis of the hinge can be transformed between a straight line and the arc-like curve when the narrow band is considered to be a line in the case of ignoring the width and thickness of the narrow band. In practice, the width of the narrow band is generally about 3-4 times than the thickness of the shield plate. Since the bulletproof material generally does not have significant low-tension stretching and retracting characteristics, if the narrow band is wider than the above range, the narrow band as a hinge-like structure weakens the connection constraint of adjacent elastic shield plate blocks, and the straightened state of the shield after being unfolded may become unstable; and if the narrow band is narrower than the above range, the tension of the large curved side of the narrow band after being bent and folded is too large, the folding of the shield becomes difficult, and the structure of the elastic shield plate block may be even destroyed.

The unfolding power device of this technical solution is composed of elastic shield plate blocks with a cross section in the shape of an arc-like curve and a soft hinge-like structure. When the shield is in the folded state, the shield plate blocks are forced to deform into a nearly flat plate shape due to the constraint of the soft hinge and the strap or cable of the release control device, and the mechanical energy is stored in the elastic shield plate blocks in an elastic deformation form. When the release control device removes the constraint of the strap or cable, the elastic shield plate blocks recover the arc-like cross-sectional shape and force the entire shield to return to the unfolded state under the action of the soft hinge.

The present invention will be further described below in conjunction with the accompanying drawings and specific embodiments.

BRIEF DESCRIPTION OF THE DRAWINGS

FIG. 11: a schematic perspective view of the appearance of an arc-like curved elastic shield plate in an unfolded state FIG. 12: the same as the previous figure, only the elastic metal sheet is shown in a peeled-off position FIG. 13: a perspective view of the appearance of a foldable shield having an arc-like curved elastic shield plate in a folded state FIG. 14: a perspective view of the appearance of the above device in an unfolded state

DETAILED DESCRIPTION OF EMBODIMENTS

Embodiment 1

For a soft foldable shield, reference is made to FIGS. 1-5.

Figure 1:
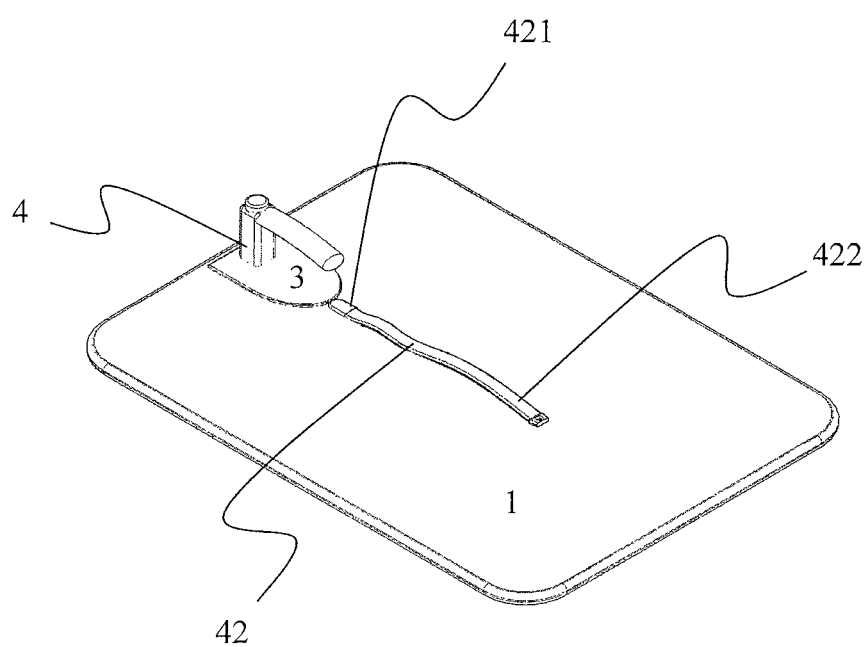
FIG. 1: a perspective view of the appearance of a soft windowless foldable shield
Figure 2:
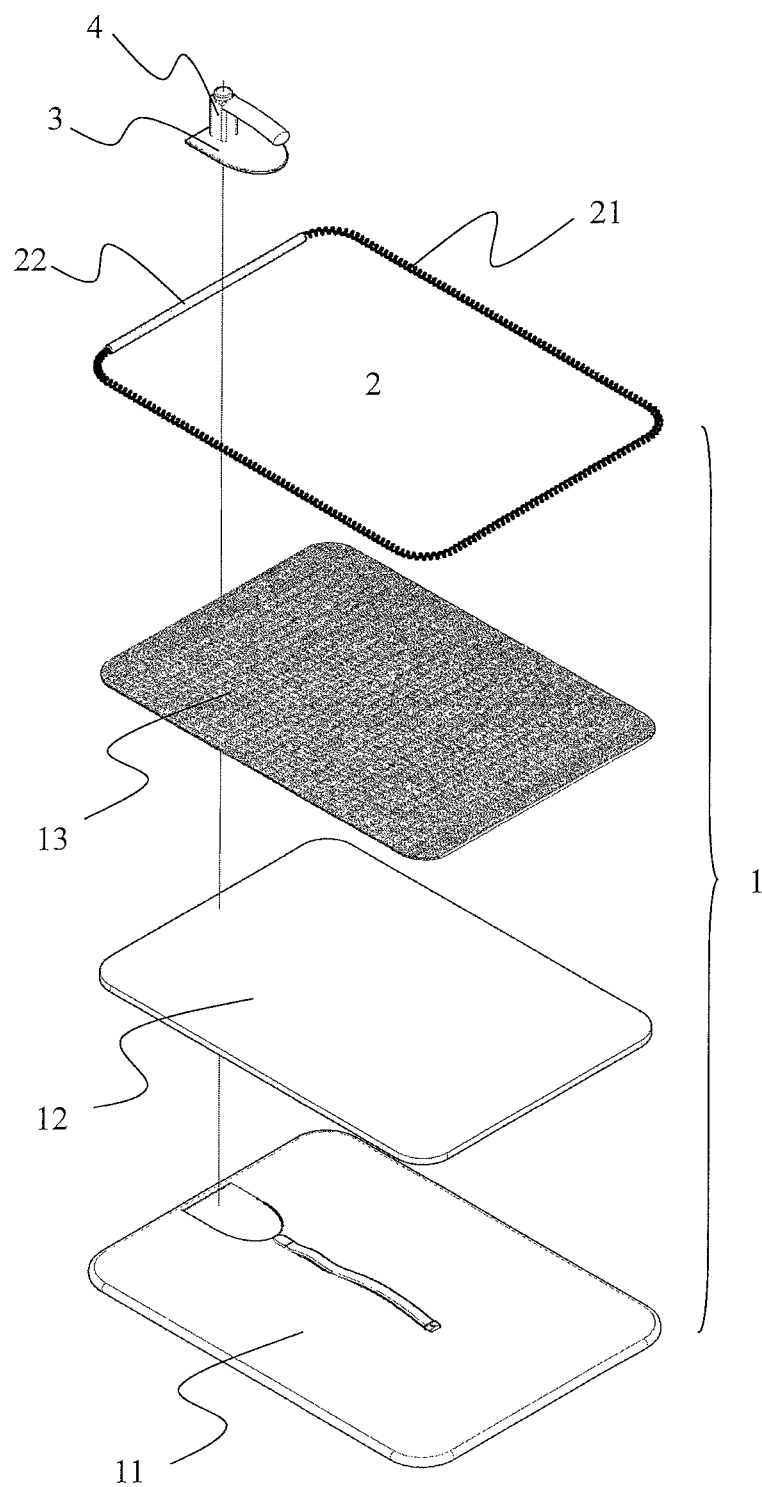
FIG. 2: an exploded perspective view of the structure of the above device

The technical solution of this embodiment specifically comprises:

a soft foldable shield plate 1, referring to FIGS. 1 and 2, the outermost layer of which is a protective jacket 11, which may be made of wear-resistant synthetic fibre fabrics such as nylon or polyamide fabric, or exposure and aging-resistant natural fabrics such as cotton and linen depending on different occasions. There is also a need to consider using waterproof fabrics or coatings if the shield plate is used in the field. A bulletproof core plate 12 is provided in the middle and may be partially bonded or stitched by a common bulletproof fabric. The bulletproof fabric may be made of carbon fibre, aramid cloth or high-energy polyethylene bulletproof cloth, preferably of the aramid cloth or high-energy polyethylene non-woven fabric, and is the main structure that prevents the penetration of a bullet. A support curtain 13 may also be provided in the middle, which is located on the rear side of the bulletproof core plate, has a shape similar to that of a common bamboo curtain, and be woven from a thin rod-shaped material with a string, or formed by sticking cloth to one side of a thin rod-shaped material, or formed by cutting one side of a tough polymer plate into parallel grooves, or thermoformed from a tough polymer. The function is to facilitate the flattening and constraint of the shield plate by a strap in the unfolding control device when the shield plate is in the folded state, such that the shield plate exhibits a flat plane or curve face when in the unfolded state. In the figure, the thin rod of the support curtain extends in the left and right direction to an edge of the shield plate, so the folding of the shield plate is limited to the folding in the up and down direction. If it is desired that the shield plate is folded in the left and right direction, the thin rod of the support curtain is provided in the up and down direction. The support curtain is not a necessary part in the shield plate. The lack of this component only affects the compactness and appearance of the soft shield in the folded state, but does not affect the function thereof.

An unfolding power device 2, referring to FIG. 2, uses an annular unfolding spring 21 here, which is located in the protective jacket 11 of the shield plate, and around the outer peripheries of the bulletproof core plate 12 and the support curtain 13. A support tube 22 is provided outside the upper annular unfolding spring to help maintain a better shield plate shape during unfolding and using.

A handle 3, referring to FIGS. 1-5, is located at the upper end of the shield plate, and comprises a handgrip 31 and a handle base 32, which are partially securely connected to the support tube 22, the support curtain 13 and the bulletproof core plate 12, respectively.

Figure 5:
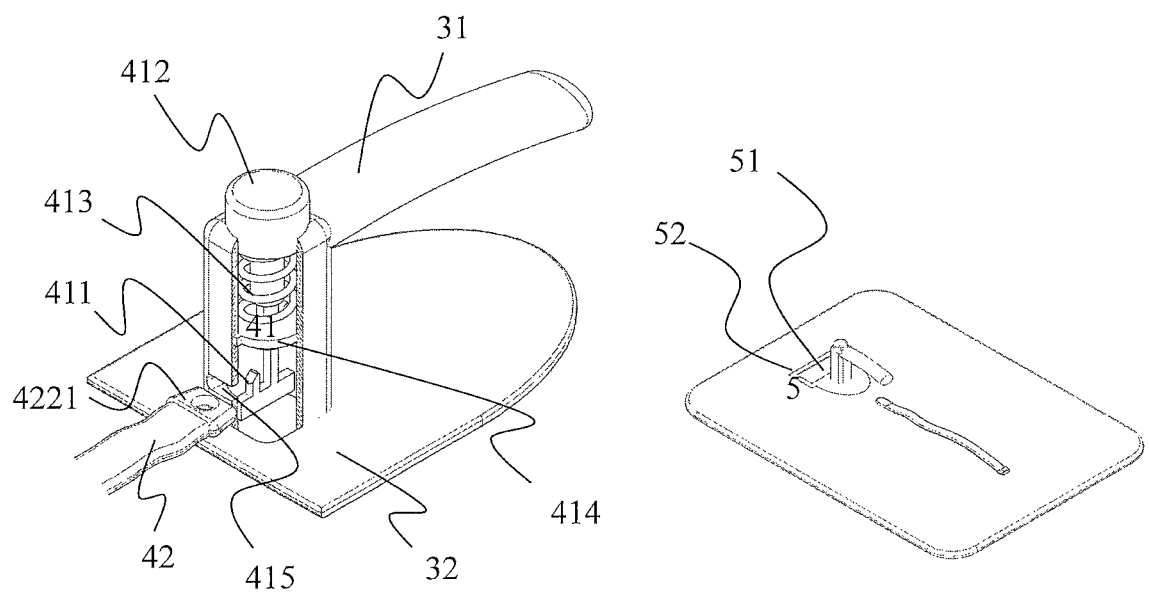
FIG. 5: a partially cutaway perspective view of a handle of the above device, illustrating the structure of an unfolding control device
Figure 6:
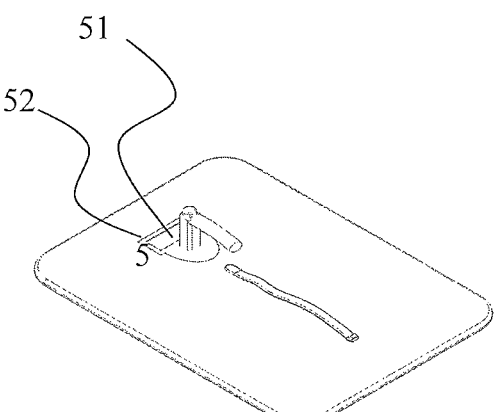
FIG. 6: a perspective view of the appearance of a soft windowed foldable shield

An unfolding control device 4, referring to FIG. 5, comprises a buckle 41 integrated with the handle and a strap 42 for constraining the shield plate. The buckle 41 comprises a lock hook 411, a button 412, a restoring spring 413, and a spring top plate 414. The handle is also the outer casing of the buckle, and a locking hole 415 is provided thereon.

One end of the strap 42 has a fixed end 421 fixedly connected to the shield plate jacket 11 or the handle base 32, and the other end is a control end 422 provided with a bolt 4221 with a hole, which can be connected to and locked by the lock hook 411 via the locking hole 415.

Figure 3:
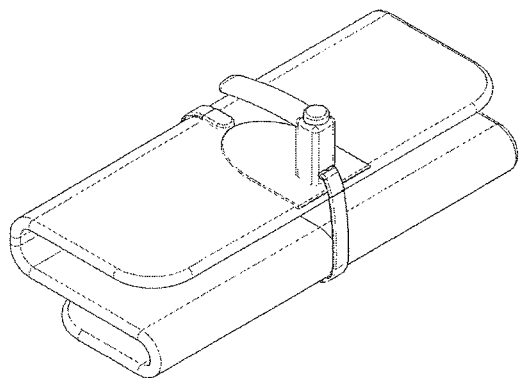
FIG. 3: a schematic perspective view of the above device folded in a bending manner
Figure 4:
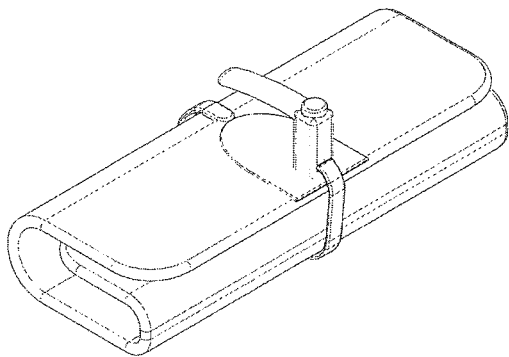
FIG. 4: a schematic perspective view of the above device folded in a curling manner

When the device is in standby, it is folded in a bending manner as shown in FIG. 3 or in a curling manner as shown in FIG. 4, the strap 42 is wrapped around the folded shield plate, and the bolt 4221 is inserted into the locking hole 415 to be locked.

When in use, a hand holds the handgrip 31 of the handle with the thumb facing upward and pressing the button 412 downward, the bolt is released, and the shield plate 1 is opened and suspended to enter the protection state.

Embodiment 2

For a soft foldable shield with an observation window, reference is made to FIGS. 5-10.

Figure 7:
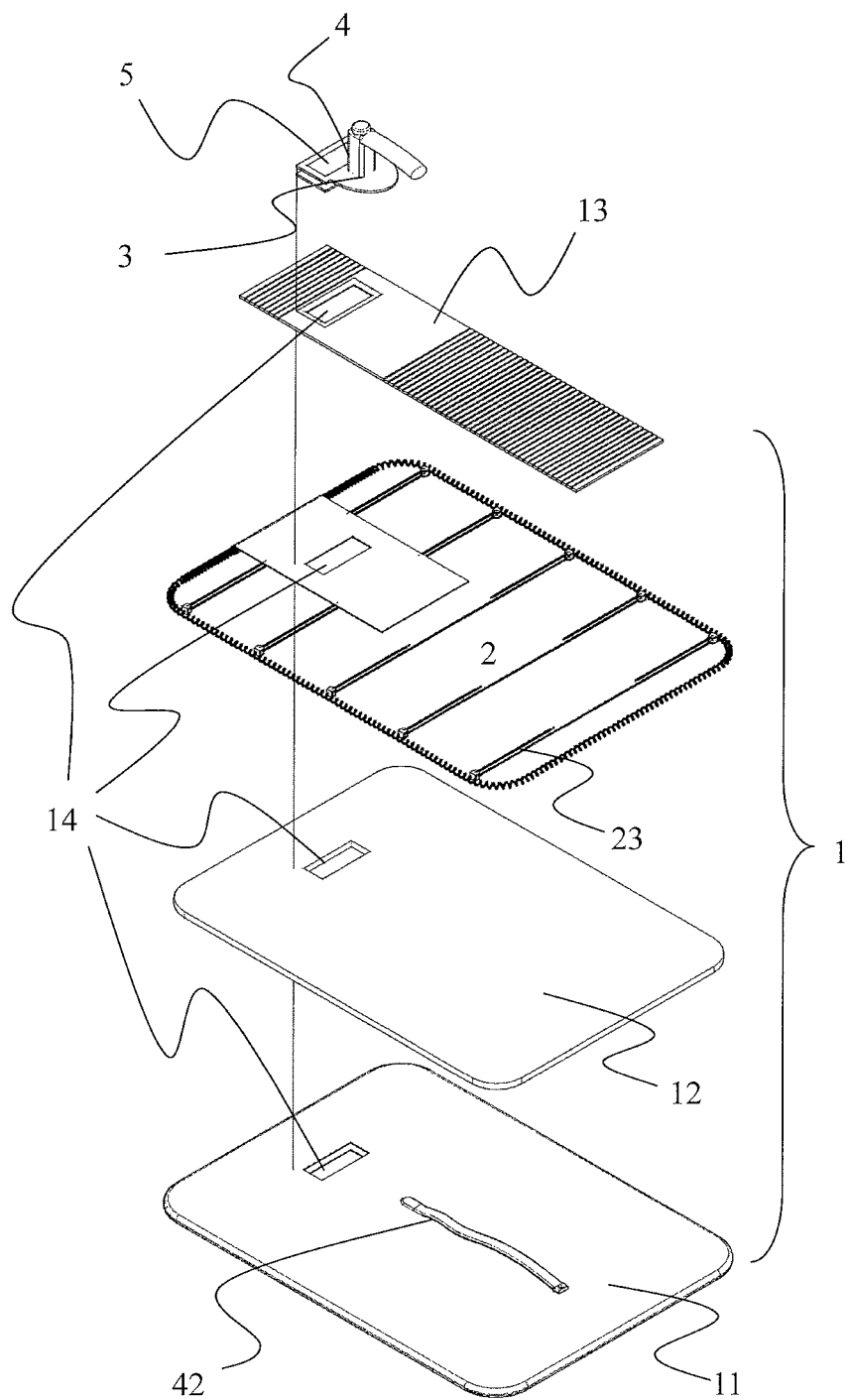
FIG. 7: an exploded perspective view of the structure of the above device

On the basis of embodiment 1, a bulletproof observation window 5 is added, and the unfolding power device 2 is improved. The specific technical solution comprises:

a shield plate 1, referring to FIG. 7, wherein an observation window mounting hole 14 is provided in an upper portion of the shield plate, and the mounting hole 14 penetrates through the entire shield plate, and the distance from the upper edge of the shield plate is sized to be sufficient to cover the portion of the human body above the eyes in the front.

A handle 3 and an unfolding control device 4, referring to FIGS. 5, 6, 7 and 9, which are identical to embodiment 1, are located immediately below the observation window. The bulletproof window comprises bulletproof glass 51 and a frame 52, wherein the bulletproof glass may be made of high-strength organic materials such as polycarbonate or multilayer inorganic materials and a high-toughness plate. The bulletproof window and the bulletproof core plate 12 need to be securely connected. The handle base 32 may be integrated with the bulletproof window frame.

The width of the support curtain is less than ½ of the width of the shield plate, and the parts of the support curtain that are located at the observation window 5 and the handle 3 are provided in a hard plate shape.

Figure 8:
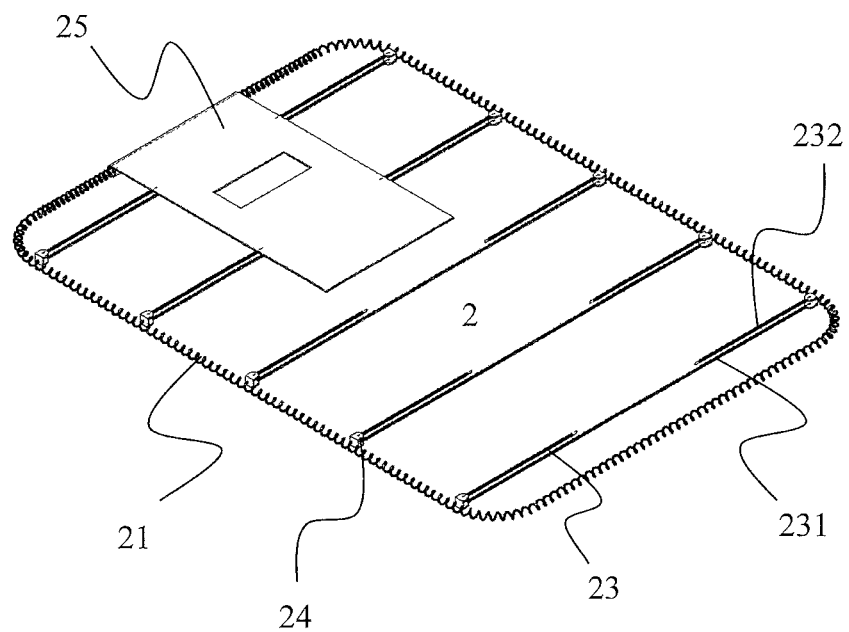
FIG. 8: a perspective view of a spring unfolding power device of the above device

An unfolding power device 2, referring to FIGS. 7 and 8, is provided, a number of transversely unfolding spring sets 23 are respectively provided on the front and rear sides of the bulletproof core plate, the front side of the bulletproof core plate is provided with compression springs 231, and the rear side is provided with tension springs 232, which are respectively closely reinforced with the bulletproof core plate 12 via the wear-resistant fabric. Two ends of the compression spring 231 are connected to edge connectors 24. The tension spring is divided into two sections, with the two sides being connected to the edge connectors 24, and the middle being connected to the support curtain 13 or a spring plate 25. By setting the length of each of the compression spring 231 and the tension spring 232, the shield plate can be set as a plane or transversely curved surface after being unfolded. The spring plate 25 is provided on the upper portion of the shield plate 1, covers the portion above the handle 3 and the observation window 5, is located between the bulletproof core plate 12 and the support curtain 13, and is wound into a tubular shape at the upper edge of the shield plate 1, and the annular expansion spring 21 passes through the tube.

Figures 9, 10:
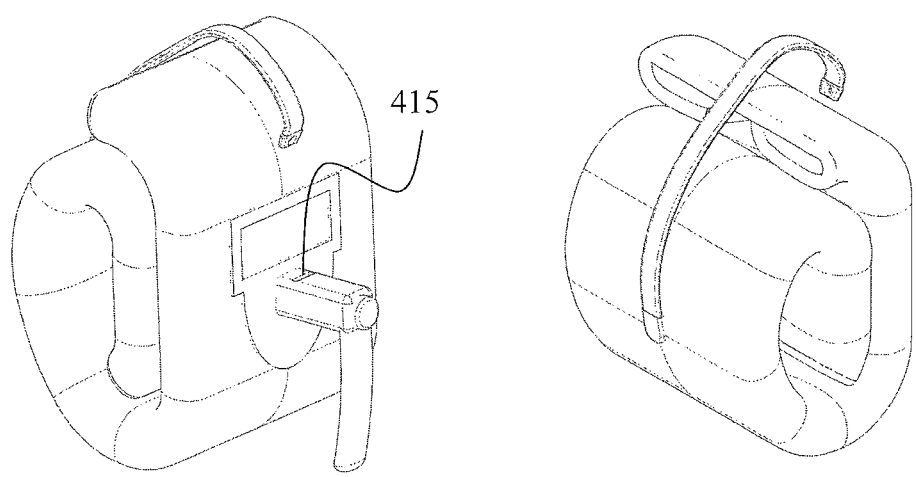
FIG. 9: a schematic perspective view of the above device folded in a bending and curling manner
FIG. 10: another viewing angle of the object illustrated in the previous figure
Figure 15:
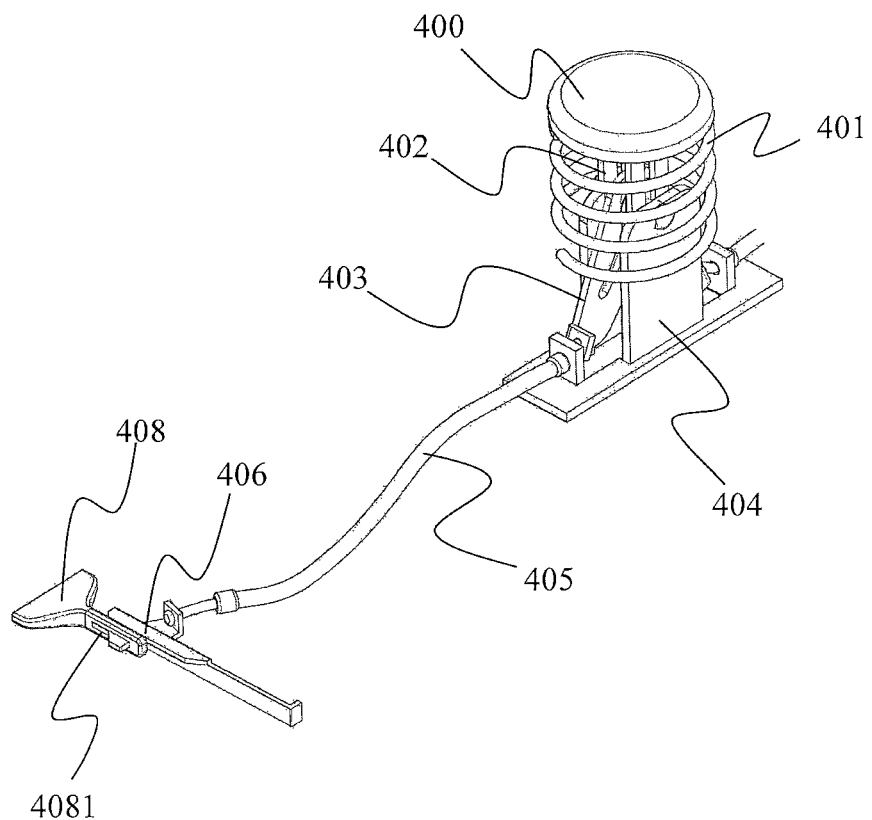
FIG. 15: a partial perspective view of the main functional components of an unfolding control device of the above device
Figure 16:
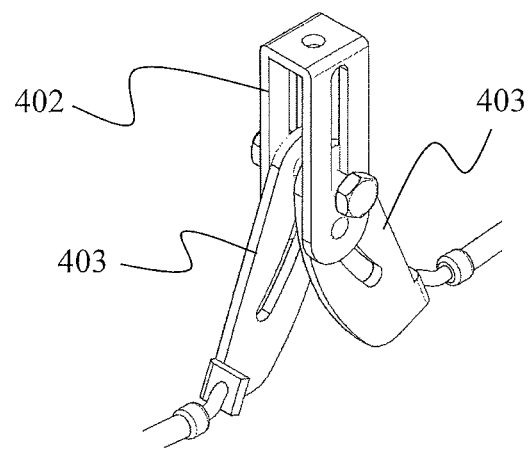
FIG. 16: a perspective view of an intermediate component of the above unfolding control device

When the device is in standby, in accordance with the bending+curling folding manner as shown in FIGS. 9 and 10, that is, the left and right sides of the shield plate are bent toward the front and the middle, and then rolled forward from the bottom to the top, and the strap bolt 4221 is inserted into the lock hole 415 to be locked.

When in use, a hand holds the handgrip 31 of the handle with the thumb facing upward and pressing the button 412 downward, the shield plate 1 is firstly unfolded in the up and down direction, and is then opened in the left and right direction to enter the protection state.

Embodiment 3

For a foldable shield having an arc-like curved elastic shield plate, reference is made to FIGS. 11-16.

Reference is made to FIGS. 11 and 12. The shield plate 1 is composed of four elastic shield plate blocks 101 with a cross section in the shape of an arc-like curve, and soft curved narrow bands 102 which also have the function of preventing passage of a ballistic object and are equivalent to a soft hinge-like structure, the width A of the narrow band being about 3-4 times of the thickness B of the shield plate.

In actual production, the main structure of the entire foldable shield plate is formed by strongly fixing a plurality of soft bulletproof fabric layers 1001 with four elastic metal sheets 1011. The elastic metal sheet 1011 may be sandwiched in the middle of the soft bulletproof fabric layer 1001 or located on front or rear side of this layer, and the periphery of the elastic metal sheet 1011 is integrally fixed with the soft bulletproof fabric 1001 by stitching, riveting or a combination thereof. Here, the elastic metal sheet 1011 is preferably placed on the rear side, that is, on the small curved side of the cross section in the shape of an arc-like curve, and is fixed by stitching. The distance A between the two elastic metal sheets 1011 is about 3-4 times of the thickness B of the shield plate. In this way, the portion of the shield plate that is overlapped with and supported by the elastic metal sheets constitutes the elastic shield plate block 101, and the vacant portion between the elastic metal sheets forms a soft curved narrow band 102 of a soft hinge-like structure. The bulletproof material may be selected from an aramid cloth or a high-energy polyethylene non-woven fabric.

The advantage of the elastic metal sheet placed on the small curved side of the shield plate is that the bulletproof fabric has a very large modulus of elasticity, that is, it is generally considered to have no significant stretchability under the action of a weak external force, and the length of the steel sheet is considered to be incompressible under the same condition. The elastic metal sheet is placed on the small curved side of the shield plate so that each layer of the bulletproof fabric can be in a completely unfolded state when the shield plate is in use, i.e., in the unfolded state. When the bulletproof fabric is hit by a ballistic object, it facilitates rapid and even dispersion and absorption of the impact force so as to prevent the ballistic object from penetrating through the shield plate. When the shield is in the folded state, the bulletproof fabric on the large curved side is squeezed and wrinkled, but does not affect the bulletproof performance. In addition, placing the elastic metal sheet on the small curved side of the shield plate close to the human body can also disperse the impact force of the ballistic object transferred to the human body through the bulletproof fabric, which is beneficial to prevent or reduce the non-penetrating damage caused by the ballistic object to the human body.

Another manufacturing method is to layer and bond the bulletproof fabric equivalent to the elastic shield plate block portion with a strong elastic glue to form a thick plate, the portion equivalent to the soft hinge-like structure is not bonded, and the layering is retained. This also makes it possible to form a functional structure similar to the above manufacturing method.

Reference is made to FIGS. 13-16. Considering that the position of the handle 3 is suitable for being provided in the middle of the top end of the shield and located on the small curved side close to the body, the folded shield plate needs to be bound at two ends to form a relatively regular shape. The unfolding control device is a double-buckle binding device consisting of a button 400, a button spring 401, a button push frame 402, slide levers 403 and a bracket 404, which are provided at the upper end of the handle, and conductive wires 405, spring bolts 406, belts 407, belt inserts 408 and fixed casing support components 409 which are provided outside the button. The fixed casing support components 409 and the fixed ends 4071 of the belt are fixedly connected to the uppermost elastic shield plate block 101, respectively.

When in use, the hand holds the handle of the shield in the folded standby state with the thumb facing upward, and pressing the button 400 downward, the two slide levers 403 generate the pulling actions in the left and right directions, which are transmitted to the spring bolts 406 via the conductive wires 405, the spring bolts 406 are pulled out of through holes 4081 of the belt inserts 408, the belts are released, the folded shield is opened under the resilient restoring force of the elastic shield plate block 101, and the shield rapidly switches to the unfolded use state.

The invention claimed is:

1. A bulletproof shield, comprising:
a foldable shield plate,
a handle,
an unfolding power device and
an unfolding control device,
wherein:
the foldable shield plate is made of a continuous bulletproof material capable of preventing passage of a ballistic object, and is configured to switch between a folded state and an unfolded state by means of self-deformation;
the unfolding power device stores energy required to enable the shield plate to switch from the folded state to the unfolded state, and maintains the unfolded shield plate in a desired shape;
the handle is connected to the shield plate at an appropriate position for easy grip;
the unfolding control device is capable of maintaining the shield in the folded state and enabling the bulletproof shield to switch from the folded state to the unfolded state under operation of a user,
the foldable shield plate comprises a plurality of elastic shield plate blocks each having a cross section including a curve, the plurality of elastic shield plate blocks joined to one another by soft hinges extending horizontally between each of the plurality of elastic shield plate blocks, the hinges configured to prevent passage of the ballistic object, wherein the cross-section including a curve is selected from the group consisting of an arc, an elliptic arc, and an arced line comprising a plurality of curved portions and optionally one or more straight portions.

2. The bulletproof shield of claim 1, characterized in that the folding of the shield plate is achieved by bending, curling or a combination thereof, wherein the bending means a plate structure being alternately folded into an overlapping structure along one or more straight lines that are not in direct intersect with each other, the straight line being referred to as a folding line; and the curling means a plate structure being rolled into a cylindrical shape along a straight line as an axis, and the unfolding power device comprises an annular unfolding spring provided at an edge of the shield plate.

3. The bulletproof shield of claim 1, characterized in that the width of the narrow band is about 3 to 4 times of the thickness of the shield plate.

4. The bulletproof shield of claim 1, characterized in that the elastic shield plate having the cross section in the shape of the arc curve is composed of two structural layers, namely a soft bulletproof fabric layer and an elastic metal sheet layer, wherein the elastic metal sheet layer is sandwiched in the middle of the soft bulletproof fabric layer or located on front or rear side of the soft bulletproof fabric layer, and the two structural layers are strongly fixed around the elastic metal sheet.

5. The bulletproof shield of claim 4, characterized in that the elastic metal sheet layer is located on a small curved side of the soft bulletproof fabric layer.

6. The bulletproof shield of claim 1, characterized in that the unfolding control device comprises a buckle binding device consisting of a buckle and a strap for fastening the folded shield plate.

7. The bulletproof shield of claim 1, characterized in that the unfolding control device is a double-buckle binding device consisting of a button, a button spring, a button push frame, slide levers and a bracket which are provided on the handle, and conductive wires, spring bolts, belts, belt inserts and fixed casing support components which are provided outside the button.

* * * * *